US008888117B2

(12) United States Patent
Barkley et al.

(10) Patent No.: US 8,888,117 B2
(45) Date of Patent: Nov. 18, 2014

(54) SUSPENSION SYSTEMS AND METHODS FOR BICYCLES

(71) Applicant: Cirrus Cycles, Inc., Bellingham, WA (US)

(72) Inventors: Paul Barkley, Bellingham, WA (US); Charlie Heggem, Bellingham, WA (US)

(73) Assignee: Cirrus Cycles, Inc., Bellingham, WA (US)

( * ) Notice: Subject to any disclaimer, the term of this patent is extended or adjusted under 35 U.S.C. 154(b) by 0 days.

(21) Appl. No.: 14/142,626

(22) Filed: Dec. 27, 2013

(65) Prior Publication Data

US 2014/0110979 A1    Apr. 24, 2014

Related U.S. Application Data

(63) Continuation of application No. 13/602,183, filed on Sep. 2, 2012, now abandoned.

(60) Provisional application No. 61/530,086, filed on Sep. 1, 2011.

(51) Int. Cl.
*B62J 1/02* (2006.01)
*B62J 1/06* (2006.01)

(52) U.S. Cl.
CPC ... *B62J 1/02* (2013.01); *B62J 1/065* (2013.01)
USPC .......................................................... 280/283

(58) Field of Classification Search
CPC .......................................................... B62J 1/02
USPC .......................................................... 280/283
See application file for complete search history.

(56) References Cited

U.S. PATENT DOCUMENTS

| 593,631 A | 11/1897 | Wood |
| 598,186 A | 2/1898 | Thompson |
| 1,112,354 A | 9/1914 | Brooks |
| 1,416,942 A | 5/1922 | Brooks |

(Continued)

FOREIGN PATENT DOCUMENTS

| DE | 833 455 | 3/1952 |
| DE | 42 27 226 A1 | 2/1994 |
| FR | 633.091 | 1/1928 |

OTHER PUBLICATIONS

International Preliminary Report on Patentability and Written Opinion mailed Mar. 4, 2014, issued in corresponding International Application No. PCT/US2012/053577, filed Sep. 2, 2012, 5 pages.

*Primary Examiner* — Joseph M Rocca
*Assistant Examiner* — Felicia L Brittman
(74) *Attorney, Agent, or Firm* — Christensen O'Connor Johnson Kindness PLLC

(57) ABSTRACT

A bicycle seat suspension assembly has a parallelogram pivoting linkage connecting the frame with the seat. The parallelogram linkage has a frame link, seat link, upper link, and lower link. An upper spring assembly pivotally engages the frame link on one end and extends up to pivotally engage the upper link. A lower spring assembly pivotally engages the frame link on one end and the lower link on the other end. The suspension assembly is movable between an uppermost position wherein the upper and lower spring assemblies are precompressed, and a second position wherein the upper and lower spring assemblies are further compressed. In some embodiments one or both of the spring assemblies have a compression spring that can be swapped out with another compression spring to adjust the spring rate of the assembly.

21 Claims, 16 Drawing Sheets

(56) References Cited

U.S. PATENT DOCUMENTS

| | | |
|---|---|---|
| 2,162,476 A | 6/1939 | Casper |
| 2,714,001 A | 7/1955 | Hersey |
| 5,467,665 A | 11/1995 | Huang |
| 5,489,139 A | 2/1996 | McFarland |
| 5,511,444 A | 4/1996 | Clausen |
| 5,529,326 A | 6/1996 | Hwang |
| 5,702,093 A | 12/1997 | Liao |
| 6,089,656 A | 7/2000 | Hals |
| 6,270,065 B1 | 8/2001 | Hals |
| 6,409,130 B1 | 6/2002 | Maret |
| 6,688,684 B2 | 2/2004 | Huang |
| 7,025,367 B2 | 4/2006 | McKinnon |
| 7,681,899 B2 | 3/2010 | Fujiwara |
| 8,007,041 B2 | 8/2011 | Tisue |
| 2005/0225132 A1 | 10/2005 | Tisue |
| 2010/0187870 A1 | 7/2010 | Mackenroth |

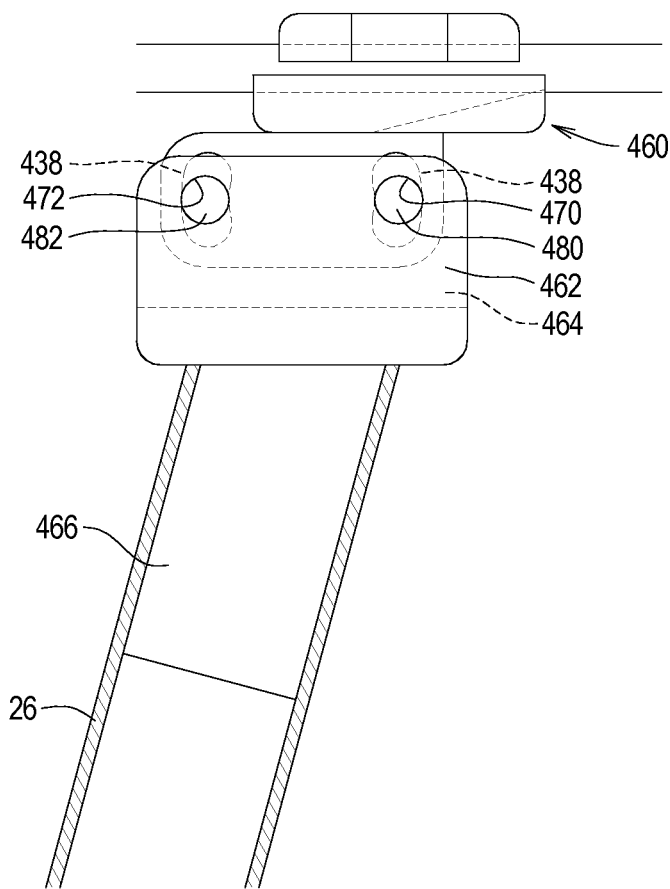

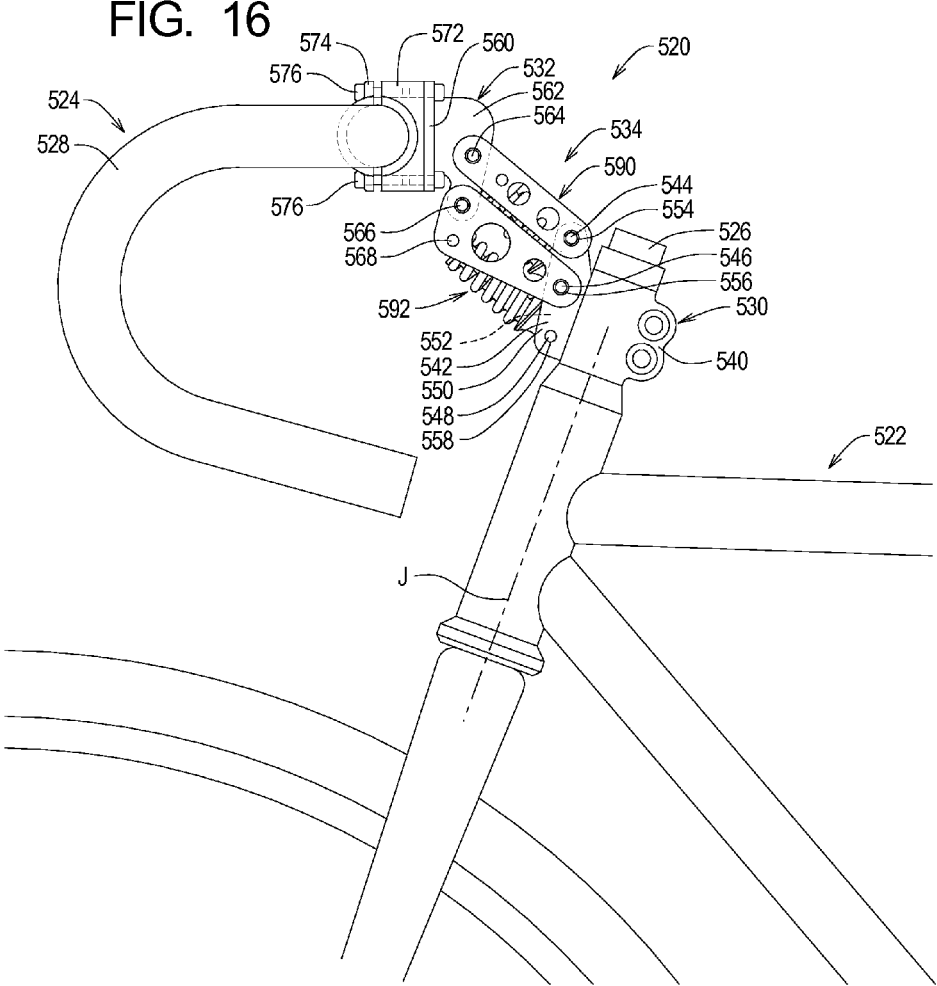

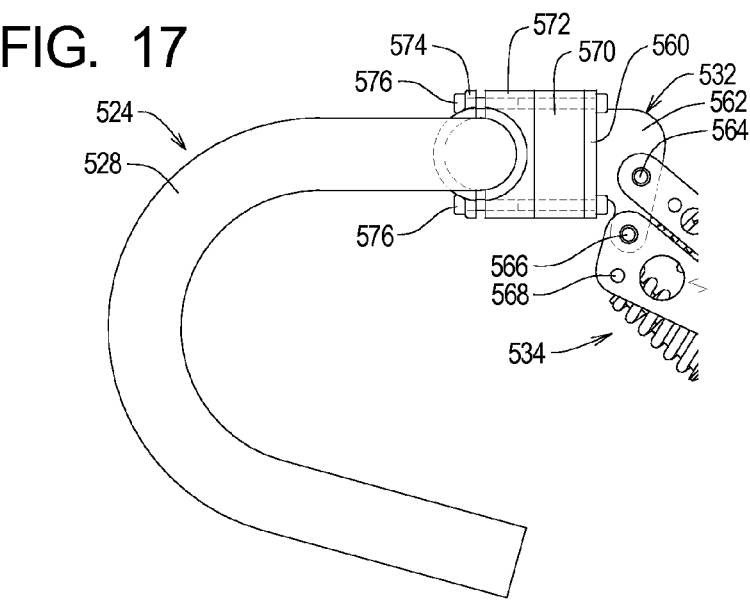
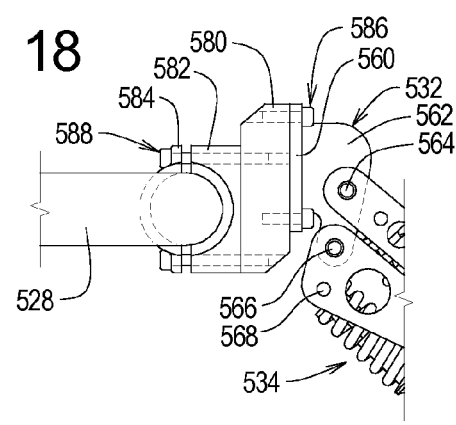
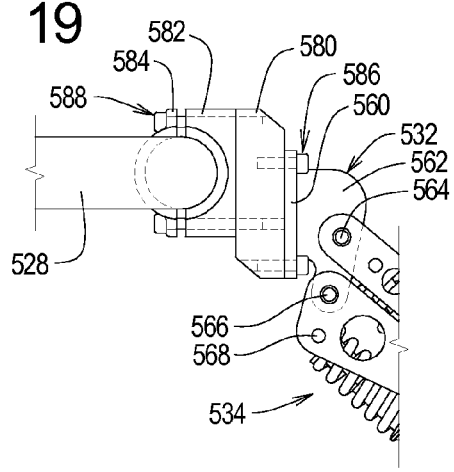

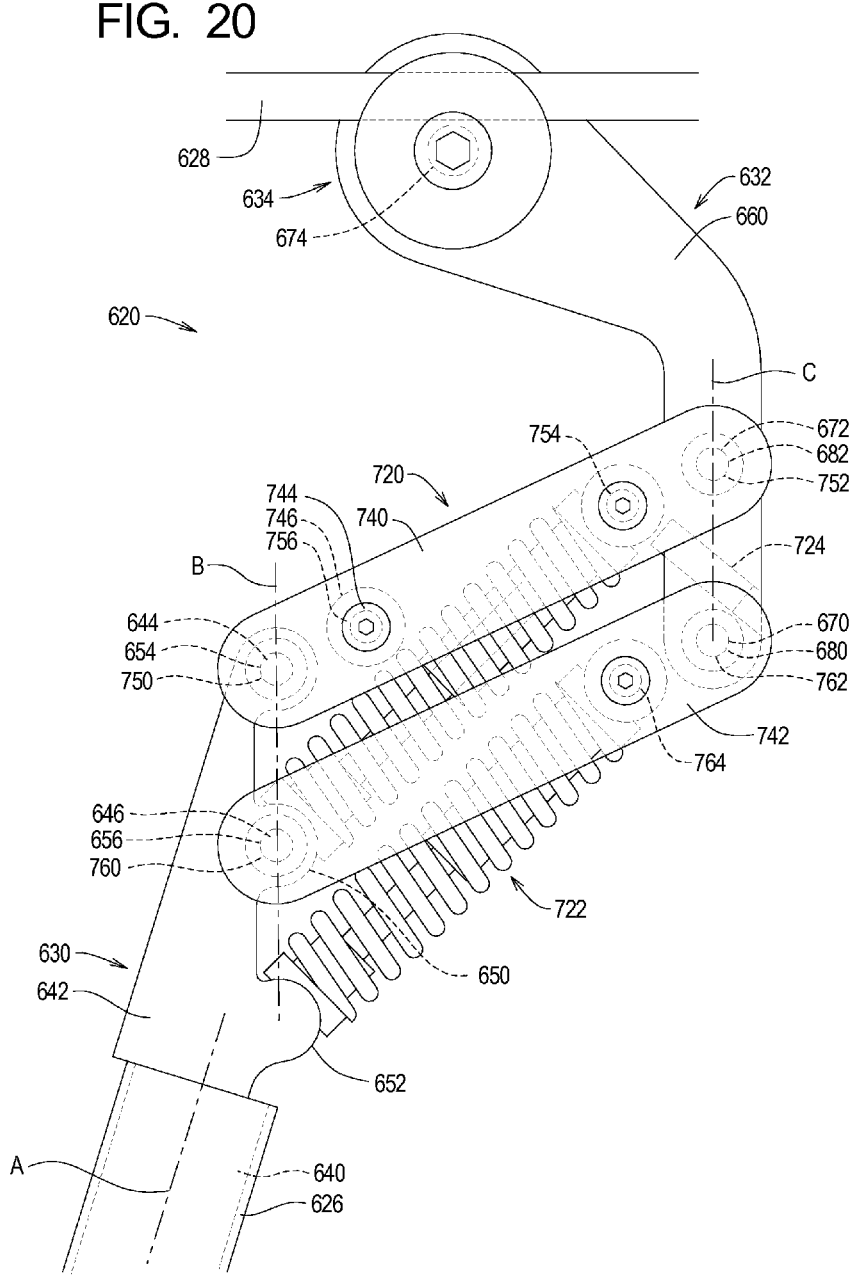

SUSPENSION SYSTEMS AND METHODS FOR BICYCLES

CROSS-REFERENCES TO RELATED APPLICATIONS

This application is a Continuation of U.S. patent application Ser. No. 13/602,183 filed Sep. 2, 2012, which claims benefit of U.S. Provisional Application No. 61/530,086 filed Sep. 1, 2011, the entire disclosures of which are hereby incorporated by reference herein.

BACKGROUND

The present invention relates to vehicle suspension systems and methods and, more specifically, to suspension systems and methods configured to be used as with bicycles.

A bicycle typically comprises a frame assembly, wheels, a seat, a fork, a handle bar, a pedal set, and a brake system. The fork is rotatably attached to the frame assembly, and a seat post of the seat is rigidly attached to the frame. A hub of the front wheel is attached to the fork, and a hub of the rear wheel is attached to the frame assembly. The pedal set is supported by the frame and connected to the rear wheel. A rider of the bike sits on the seat, grasps the handle bar with the hands, and rotates the pedals with the feet.

Conventionally, the fork and frame assembly acted as rigid structures with respect to the seat and handle bar, and shocks were transmitted to the handle bar through the front wheel and the fork and to the seat through the rear wheel, the frame assembly, and the seat. These shocks were in turn transmitted to the rider, primarily through the handle bar and the seat.

To reduce shocks on the rider, various suspension systems have been employed. Initially, the bicycle seat was padded, and springs were arranged between the seat and the frame to inhibit transmission of shocks to the rider sitting on the seat. Springs have also been arranged in the seat posts to inhibit transmission of shocks to the rider. Suspension seats and seat posts may be applied to a conventional bicycle having a rigid frame and fork but provide only limited shock absorption.

Another class of bicycle suspension systems requires the modification of one or both of the frame and fork.

One form of vehicle suspension system that requires a modified frame entirely eliminates the part of the frame that receives the seat post. The seat is instead supported on a spring arm extending backwards from the modified frame to inhibit transmission of shocks to the rider sitting on the seat. This variety of vehicle suspension system requires a radically modified frame and may not be applied to most bicycle frames on the market.

Suspension systems have been applied to the fork to inhibit transmission of shocks to the rider's arms. In particular, the fork is divided into a steerer member and a fork member. The steerer member is connected to the handle bar, and the steerer member is connected to the fork member by a pneumatic suspension system arranged to resiliently oppose movement of the fork member to move relative to the steerer member along a fork axis. Suspension forks, while highly effective for off-road riding, are relatively heavy and expensive and are not preferred for use on bicycles built for road biking.

Full suspension bicycles typically employ, in addition to a shock absorbing fork, a two piece frame assembly in which a first part of the frame is pivotably connected to a second part of the frame. The first part of the frame typically supports the seat and the pedal set, and the second part of the frame supports the rear wheel. In this case, a spring and/or pneumatic shock absorbing system is arranged to resist movement of the second part of the frame relative to the first part of the frame. Again, full suspension bicycles, while highly effective for off-road riding, are relatively heavy and expensive and are not preferred for road biking.

The need exists for vehicle suspension systems and methods that effectively reduce shocks on the rider.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention may be embodied as a suspension system for a bicycle comprises a first adapter, a second adapter, at least one upper link plate, at least one lower link plate, an upper resilient system, and a lower resilient system. The at least one upper link plate is connected between the first and second adapters. The at least one lower link plate is connected between the first and second adapters. The upper resilient system is connected between the first and second adapters. The lower resilient system is connected between the first and second adapters. The upper and lower link plates allow movement of the first adapter from a first position to a second position relative to the first adapter. The upper and lower resilient systems are arranged to bias the second adapter into the first position. The upper and lower resilient systems resiliently oppose movement of the second adapter towards the second position.

The present invention may also be embodied as a mounting system adapted to engage first and second seat rails of a bicycle seat comprising a base member, first and second clamp members, and a plurality of clamp screws. The base member defines first and second rail grooves. The first clamp member defines at a third rail groove. The second clamp member defines a fourth rail groove. One of the clamp screws secures the first clamp member to the base member such that the first and third rail grooves receive the first seat rail. One of the clamp screws secures the second clamp member to the base member such that the second and fourth rail grooves receive the second seat rail.

The present invention may also be embodied as a method of forming a suspension system for a bicycle comprising the following steps. First and second adapters are provided. At least one upper link plate and at least one lower link plate are connected between the first and second adapters such that the upper and lower link plates allow movement of the first adapter from a first position to a second position relative to the first adapter. Upper and lower resilient systems are connected between the first and second adapters such that the upper and lower resilient systems bias the second adapter into the first position and resiliently oppose movement of the second adapter towards the second position.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 15 is a side elevation view of a version of the first example mounting system used without a suspension system;

FIG. 16 is a side elevation view of a second example suspension system of the present invention;

FIG. 17 is a side elevation view of the second example suspension system with a first example mounting base;

FIGS. 18 and 19 are side elevation views of the second example suspension system with a second example mounting base in first and second offset positions, respectively;

FIG. 20 is a side elevation view of a third example suspension system of the present invention;

DETAILED DESCRIPTION

The suspension system of the present invention may take a number of different forms, and a number of examples of the present invention will be discussed separately below.

1. First Example Suspension System

Figure 1:
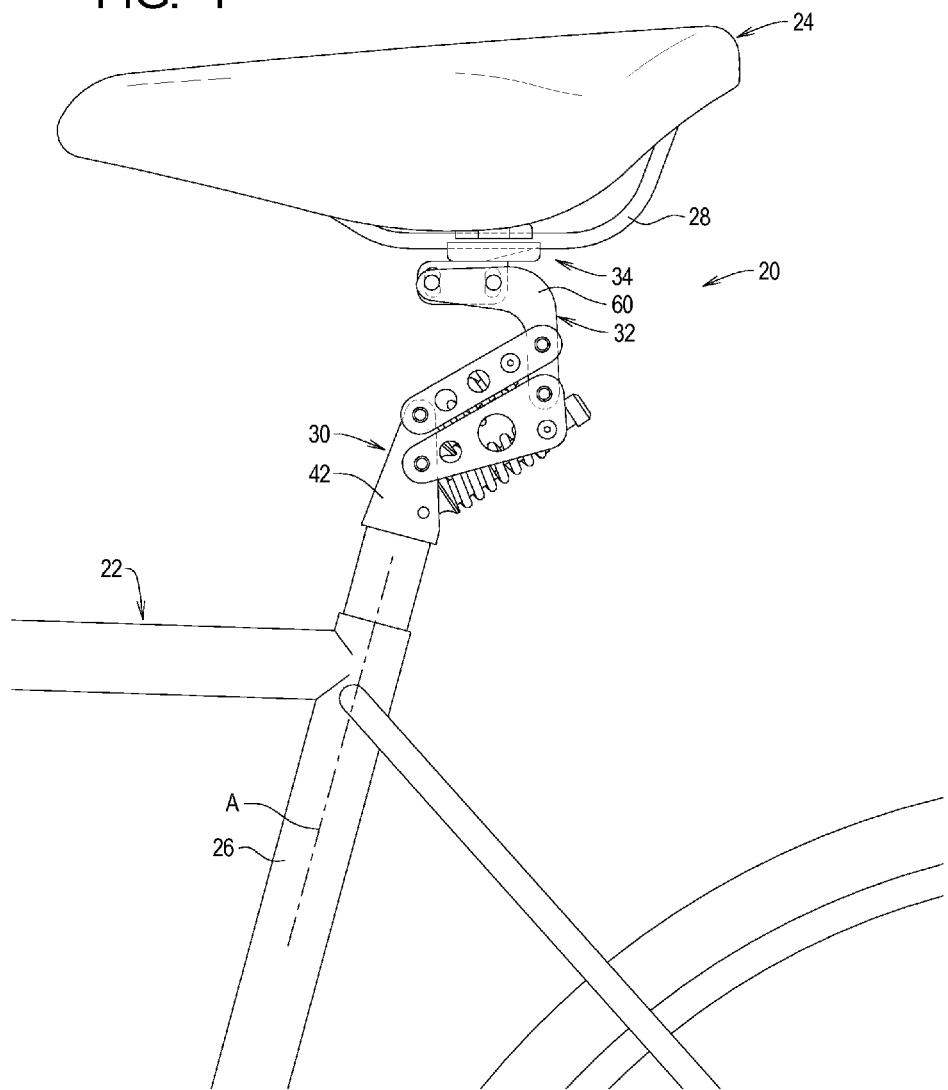
FIG. 1 is a side elevation view of a first example suspension system of the present invention shown on a bicycle frame.

Referring initially to FIGS. 1-14 of the drawing, depicted therein is a first example suspension system 20 constructed in accordance with, and embodying, the principles of the present invention. As depicted in FIG. 1, the first example suspension system 20 will typically be used in combination with a bike 22 and a seat assembly 24. The bike 22 and seat assembly 24 are not part of the present invention and will not be described herein beyond that extent necessary for a complete understanding of the present invention. The example bike 22 defines a seat tube 26 that defines a seat axis A, and the example seat assembly defines seat rails 28.

The suspension system 20 is used in combination with an example first adapter 30, an example second adapter 32, and a first example mounting system 34. The first adapter 30 is configured operatively to connect the suspension system 20 to the seat tube 26, and the second adapter 32 and mounting system 34 are configured operatively to connect the suspension system 20 the seat rails 28.

The first adapter 30 comprises a tube structure 40, a base structure 42, a first base pin 44, a second base pin 46, and a third base pin 48. The tube structure 40 is adapted to be received by and secured to the seat tube 26 in a conventional manner.

The base structure 42 defines a pair of base wall portions 50 and defines a base cavity 52, a first base opening 54, a pair of second base openings 56, and a pair of third base openings 58. In particular, the second base openings 56 are formed in the first and second wall portions 50a and 50b on either side of the base cavity 52. The third base openings 58 are formed in the first and second wall portions 50a and 50b on either side of the base cavity 52 and below the second base openings 56. The first base opening 54 is formed in a portion of the base structure 42 above the second base openings 56. The first, second, and third base openings 54, 56, and 58 are substantially arranged along a base line B that extends at an angle with respect to the seat axis A.

The first adapter 30 is formed by extending the first base pin 44 through the first base opening 54 and such that ends of the pin 44 protrude on either side of the base structure 42, the second base pin 46 through the second base openings 56 and across the base cavity 52 such that ends of the pin 46 protrude on either side of the base structure 42, and the third base pin 48 through the third base openings 58 across the base cavity 52.

The second adapter 32 comprises a first adapter plate 60 and a second adapter plate 62. The example adapter plates 60 and 62 are identical, and each defines first, second, third, and fourth adapter plate openings 70, 72, 74, and 76. The second adapter 32 further comprises first and second adapter plate pins 80 and 82 that extend through the first and second adapter plate openings 70 and 72, respectively. First and second spacers 84 and 86 are arranged over the adapter plate pins 80 and 82 between the adapter plates 60 and 62. The first and second adapter plate openings 70 and 72 are substantially arranged along and a first adapter axis C that extends at an angle with respect to the seat axis A and is substantially parallel to the base axis B. The third and fourth adapter plate openings 74 and 76 are substantially arranged along and a second adapter axis D that extends at an angle with respect to the first adapter axis C and is substantially horizontal during normal use of the bike 22 on level ground.

The second adapter 32 further comprises first and second pivot bolt assemblies 90 and 92 that extend through the third and fourth adapter plate openings 74 and 76, respectively, and engage the first example mounting system 34 as will be described in further detail below.

The first example suspension system 20 comprises a linkage system 120 and a biasing system 122. The biasing system 122 comprises upper and lower resilient systems 124 and 126. The upper resilient system 124 defines an upper biasing axis E, and the lower resilient system 126 defines a lower biasing axis F. The example linkage system 120 comprises a pair of upper link plates 130 and a pair of lower link plates 132. First, second, and third upper link plate openings 140, 142, and 144 and one or more optional weight reduction openings 146 are formed in the upper link plates 130. First, second, and third lower link plate openings 150, 152, and 154 and one or more optional weight reduction openings 156 are formed in the lower link plates 132.

To form a parallel linkage that allows movement of the second adapter 32 relative to the first adapter 30, the upper link plates 130 are connected between the first base pin 44 and the second adapter plate pin 82 and the lower link plates 132 are connected between the second base pin 46 and the first adapter plate pin 80. In particular, the first base pin 44 extends through the first upper link plate openings 140, the second base pin 46 extends through the first lower link openings 150, the second adapter plate pin 82 extends through the second upper link plate openings 142, and the first adapter plate pin 80 extends through the second lower link plate openings 152. So assembled, the linkage system 120 defines an upper link axis G and a lower link axis H.

The example upper resilient system 124 is a spring assembly comprising an upper spring 220, an upper spring anchor 222, an upper spring retainer assembly 224, and an upper spring rod 226. The upper spring retainer assembly 224 comprises an upper spring sleeve 230, an upper spring collar 232, an upper spring bumper 234, and a pair of screws 236. The upper spring anchor 222 defines a pivot portion 240, a cylinder portion 242, a stop surface 244, a pivot opening 246, and a guide cavity 248. The upper spring sleeve 230 defines a rod opening 250 and end openings 252 adapted to threadingly receive the screws 236. The upper spring collar 232 defines a flange portion 260, a cylinder portion 262, a stop surface 264, a sleeve surface 266, and a collar rod opening 268. The upper spring bumper 234 defines a bumper surface 270 and a bumper rod opening 272.

The example lower resilient system 126 is a spring assembly comprising a lower spring 320, a lower spring anchor 322, a lower spring retainer assembly 324, and a lower spring bolt 326. The lower spring retainer assembly 324 comprises a lower spring sleeve 330, a lower spring collar 332, a lower spring bottom out bumper 334, a pair of screws 336, and a lower spring top out bumper 338. The lower spring anchor 322 defines a pivot portion 340, a cylinder portion 342, a stop surface 344, a pivot opening 346, and a bolt cavity 348. The lower spring sleeve 330 defines a bolt opening 350 and end openings 352 adapted to receive the screws 336. The lower spring collar 332 defines a flange portion 360, a cylinder portion 362, a stop surface 364, a sleeve surface 366, and a collar bolt opening 368. The lower spring bottom out bumper 334 defines a bottom out bumper surface 370 and a bumper bolt opening 372. The lower spring top out bumper 338 defines a top out bumper bolt opening 380, and the lower spring bolt 326 defines a head 390 and a shaft 392 having a threaded portion 394. The bolt cavity 348 is threaded to receive the threaded portion 394 of the shaft 392.

To assemble the biasing system 122, the second and third base pins 46 and 48 are extended through the pivot openings 246 and 346 of the spring anchors 222 and 322, respectively.

The upper spring 220 is next arranged over the cylinder portion 242 and against the stop surface 244 of the upper spring anchor 222. A first end of the upper spring rod 226 is then passed through the bumper rod opening 272 and the collar rod opening 268 and inserted into the guide cavity 248. A second end of the upper spring rod 226 is inserted through the sleeve rod opening 250 and into guide cavity 248, and the screws 236 are passed through the third upper link plate openings 144 and threaded into the end openings 252 of the sleeve 230 to secure the sleeve 230 to the upper link plates 130.

The lower spring 320 is next arranged over the cylinder portion 342 and against the stop surface 344 of the lower spring anchor 322. The threaded portion 394 of the lower spring bolt 326 is then passed through the top out bumper bolt opening 380, the sleeve bolt opening 350, the bottom out bumper rod bolt opening 372, and the collar rod bolt opening 368 and threaded into the bolt cavity 348. The screws 336 are passed through the third lower link plate openings 154 and threaded into the end openings 352 of the sleeve 330 to secure the sleeve 330 to the lower link plates 132.

Figure 6:
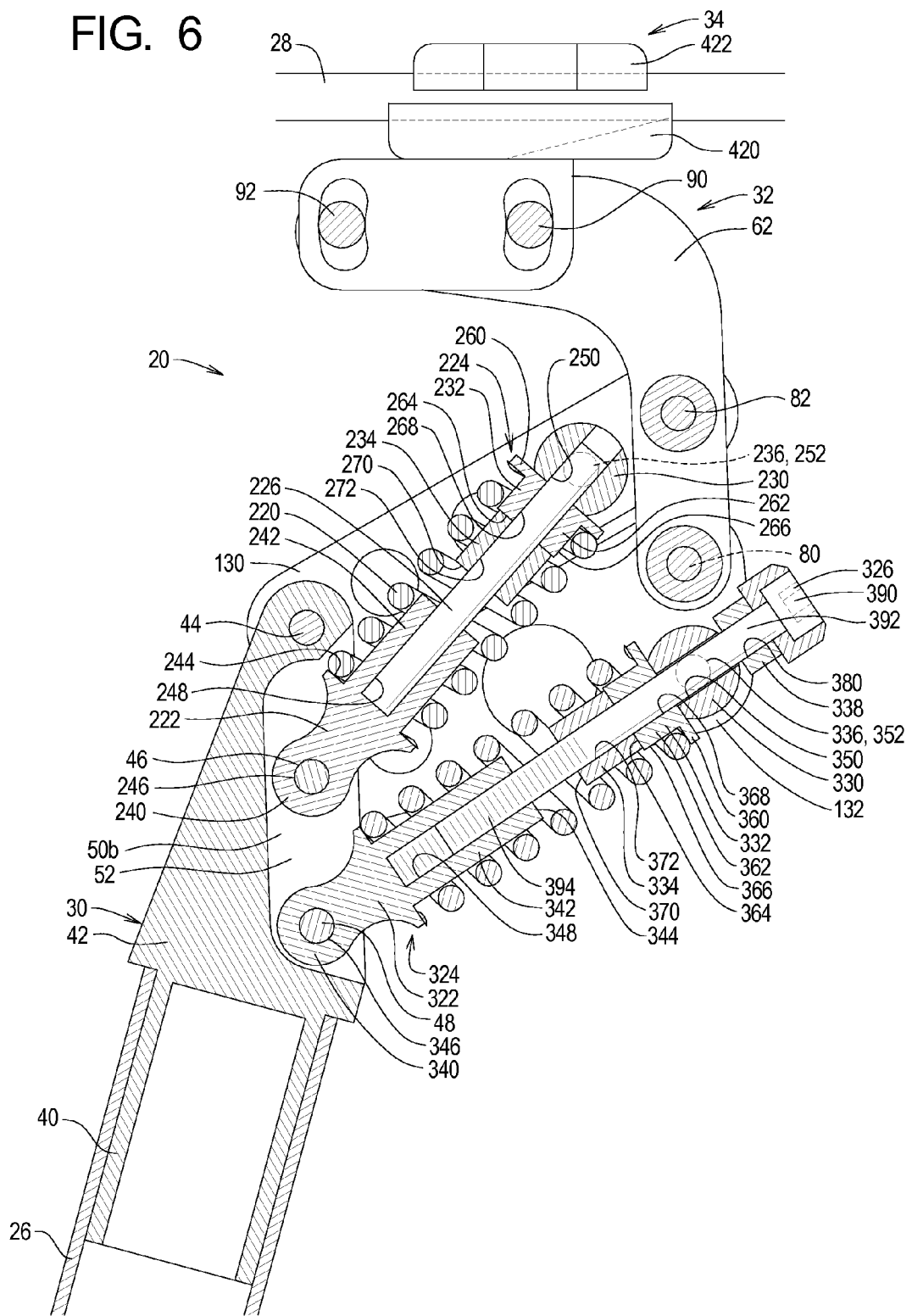
FIG. 6 is a close-up view of the first example suspension system in a first position with the seat tube, the example first adapter, and a portion of the suspension system cut-away.
Figure 7:
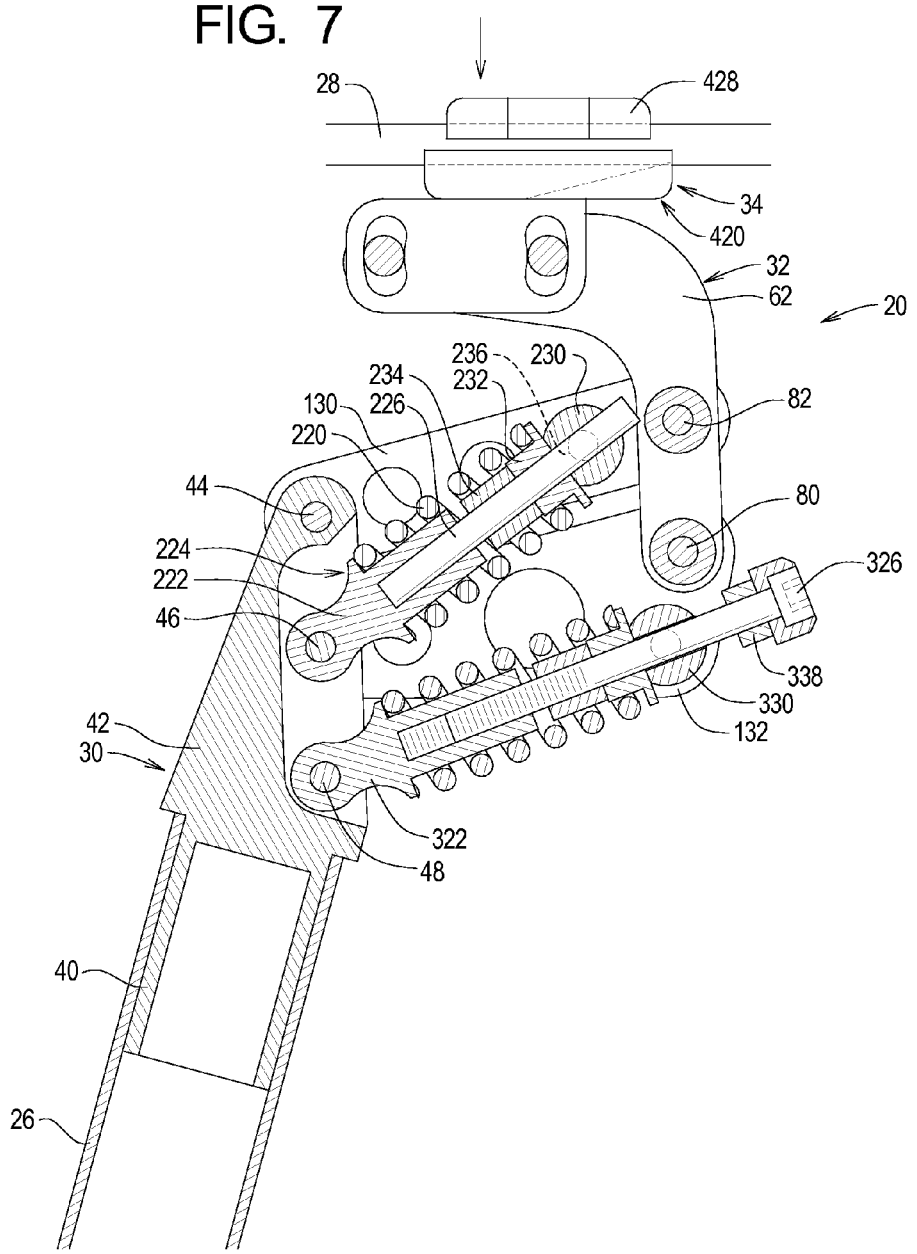
FIG. 7 is a close-up view similar to FIG. 6 with the first example suspension system in a second position.

So assembled, the linkage system 120 allows movement of the second adapter 32 along a limited arc relative to the first adapter 30 between a first position (e.g., FIG. 6) and a second position through a continuum of intermediate positions (e.g., FIG. 7). The first position is defined as the uppermost position of the second adapter 32 relative to the first adapter 30 allowed by the linkage system 120 and the spring system 122. The second position is defined as the lower position of the second adapter 32 relative to the first adapter 30 allowed by the linkage system 120 and the spring system 122.

In the first position as shown in FIG. 6, the lower spring sleeve 330 is substantially arranged along the first adapter axis C. As the linkage system 120 moves from the first position towards the second position, the lower spring sleeve 330 is displaced towards the lower spring anchor 322 and becomes offset from the first adapter axis C. The lower spring bumper 334 engages the cylinder portion 342 of the lower spring anchor 322 when the second adapter 32 reaches the second position. The location of the second adapter 32 relative to the first adapter 30 in the second position can be altered by altering a size of the lower spring bottom out bumper 334.

Additionally, the upper biasing axis E defined by the upper resilient system 124 extends at a primary spring angle relative to the lower biasing axis F defined by the lower resilient system 126. In the example suspension system 20, in the first position this primary spring angle is approximately 19 degrees, may be within a first range of approximately 17 to 20 degrees, and in any event should be within a second range of approximately 15 to 21 degrees. The upper and lower link axes G and H are substantially parallel to each other.

In the example suspension system 20, the upper biasing axis E extends at a first secondary spring angle with respect to the link axes G and H. The lower biasing axis F extends at a second secondary spring angle with respect to the link axes G and H. In the first position, the first secondary spring angle is approximately 18 degrees, may be within a first range of approximately 19 to 20 degrees, and in any event should be within a second range of approximately 17 to 21 degrees. In the first position, the second secondary spring angle is approximately 4 degrees, may be within a first range of approximately 3 to 6 degrees, and in any event should be within a second range of approximately 2 to 10 degrees.

The primary spring angle will increase slightly as the linkage system 120 moves out of the first position towards the second position as will become apparent from the following detailed discussion.

The biasing system 122 biases the second adapter 32 into the first or upper (during normal use of the bike 22) position relative to the first adapter 30 and thus relative to the bike 22. However, a rider sitting on the seat 24 will cause a slight downward movement of the second adapter 30 out of the first position and towards the second position.

Accordingly, as the bike 22 is traveling along an uneven surface, the bike 22 will tend to move up and down relative to a rider on the seat 24. This up and down movement of the bike 22 relative to the seat 24 causes shocks that are resiliently opposed by the biasing system 122. The biasing system 122 thus resiliently opposes movement of the linkage system 120 such that upward movement bike 22 relative to the seat 24 is controlled.

The transmissibility and over all spring rate of the biasing system 122 can be altered by selecting combinations of lengths and spring rates of the upper and lower springs 220 and 320 that are suitable for a particular bike setup, rider weight, and terrain conditions.

Further, axial rotation of the lower spring bolt 326 causes the bolt head 390 to act on the lower spring sleeve 330 through the lower spring washer 338 to pre-compress the biasing system 122. The lower spring bolt 326 thus forms an adjustment system that allows a pre-load force to be applied on the lower spring 320 that alters the characteristics of the suspension system 20. The lower spring bolt 325 may be replaced by a spring rod similar to the upper spring rod 226 if adjustability of the suspension system 520 is not required.

The top out bumper is thus adjustable by turning the lower spring bolt 326 and the bottom out bumper is adjustable by inserting different length and durometer elastomers as the bottom out bumper member 334. Controlling or constraining the available travel of the second adapter 32 relative to the first adapter 34 is a way of limiting the amplification of the road induced vibrations at low frequencies. Accordingly, the shock transmitted to the rider is minimized by minimizing the damping or friction in the system at higher frequencies, where amplification of road induced vibrations is not an issue.

Figure 2:
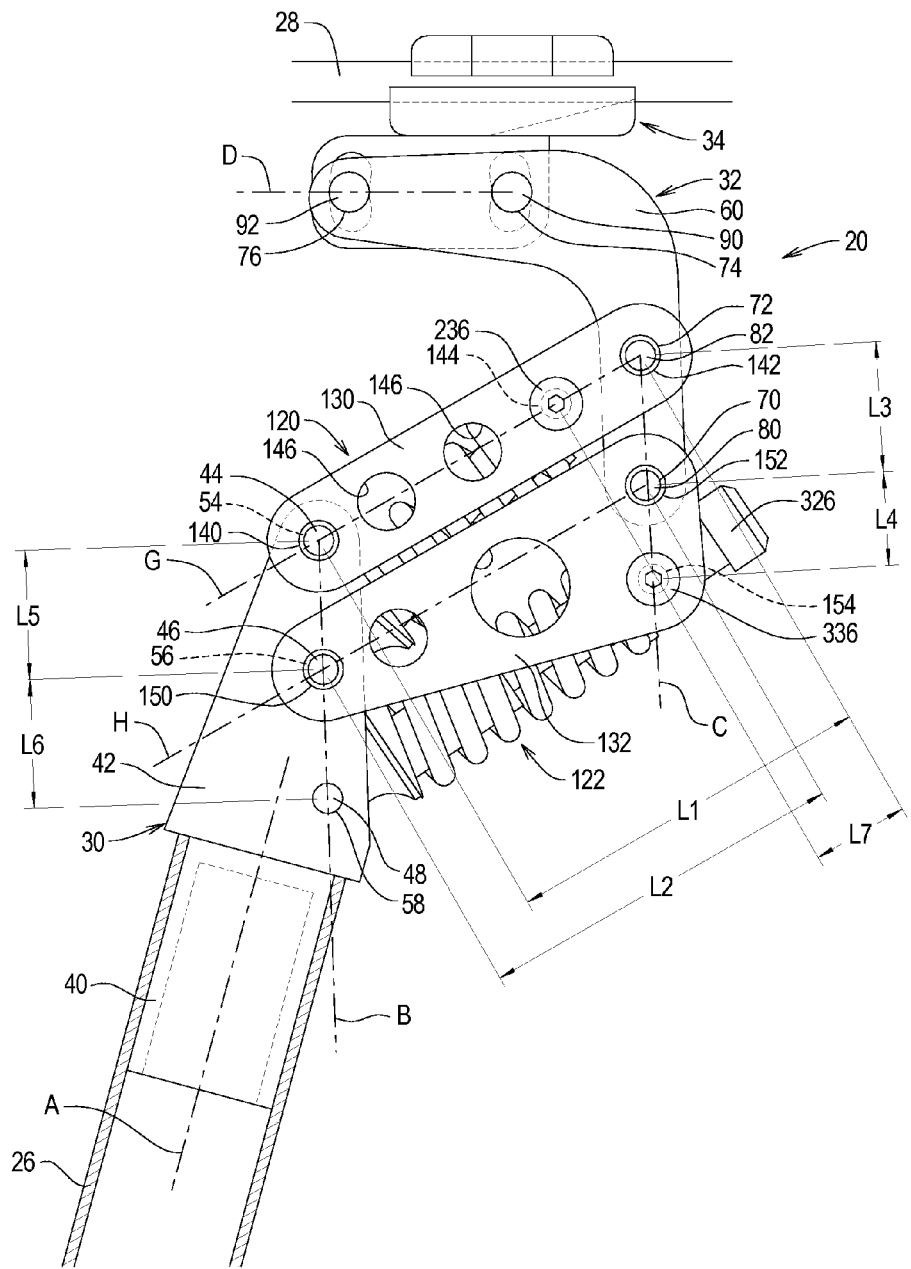
FIG. 2 is a close-up view of the first example suspension system with a seat tube cut-away.
Figure 3:
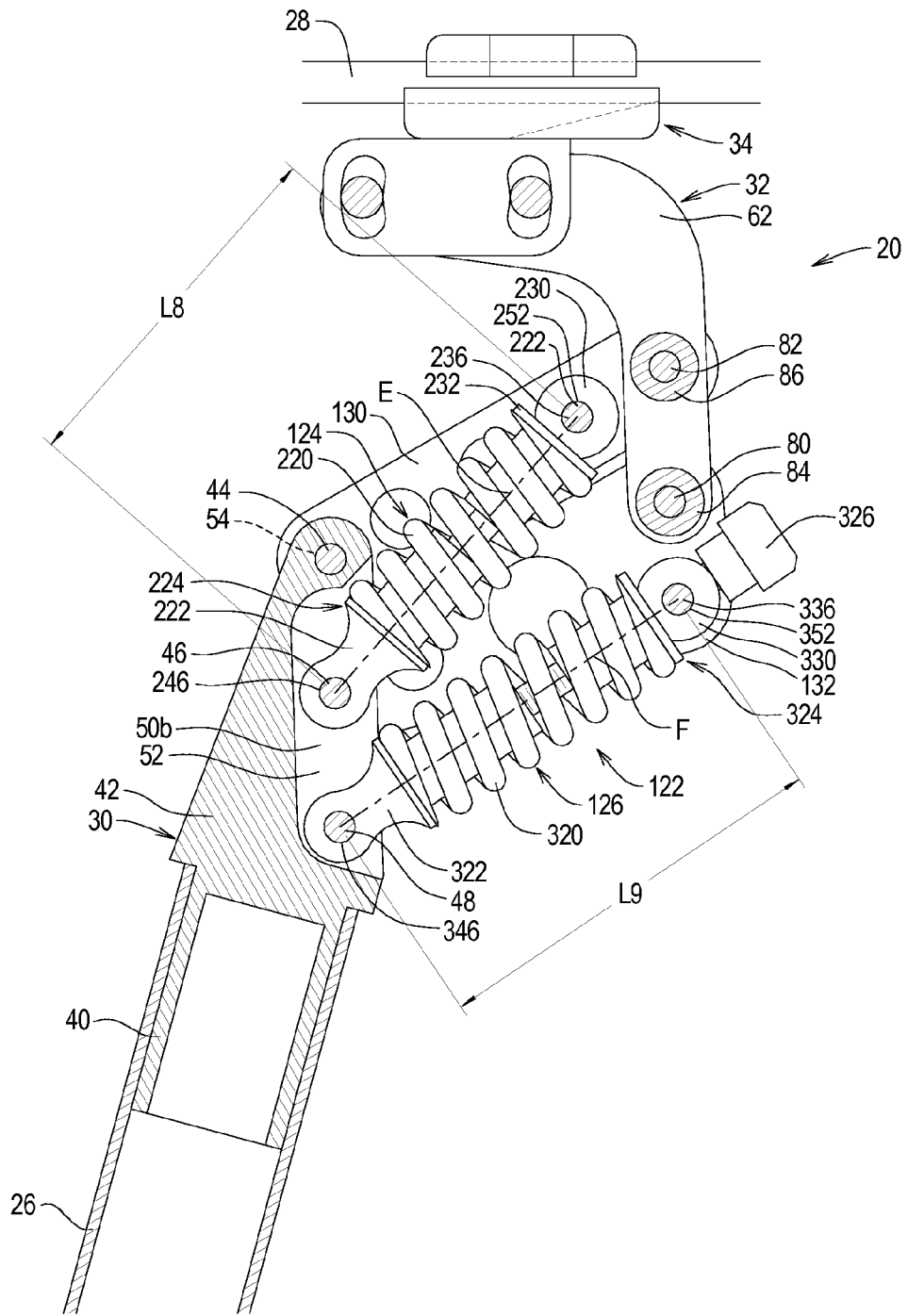
FIG. 3 is a close-up view of the first example suspension system with the seat tube, with an example first adapter therefor cut-away.

The following Table A sets forth a number of example dimensions depicted in FIG. 2 related to the geometry of the example linkage system 120 of the first example suspension system 20:

TABLE A

| Dimension | | Example | First Range | Second Range |
|---|---|---|---|---|
| L1 | | 2.3 in | 1.8-2.8 in | 1.0-4.0 in |
| L2 | | 2.3 in | 1.8-2.8 in | 1.0-4.0 in |
| L3 | | .8 in | .7-1.0 in | .7-1.5 in |
| L4 | | .6 in | .6-.8 in | .6-1.0 in |
| L5 | | .8 in | .7-1.0 in | .7-1.5 in |
| L6 | | .8 in | .7-1.0 in | .7-1.5 in |
| L7 | | .6 in | .5-.7 in | .5-.8 in |
| L8 | first position | 2.2 in | 1.8-2.8 in | .75-3.8 in |
| | second position | 1.8 in | 1.5-2.3 in | 0.5-3.4 in |
| L9 | first position | 2.5 in | 2.0-3.0 in | 1.0-4.2 in |
| | second position | 2.0 in | 1.8-2.5 in | 0.7-3.8 in |

The following Table B sets forth a number of example parameters associated with the example biasing system 122 of the first example suspension system 20. Typically, a plurality of the springs 220 and 320 (A, B, C, D, and E in Table B) will be provided for each of the upper resilient system 124 and the lower resilient system 126. Each of the plurality of springs 220 and 320 provided for each of the resilient systems 124 and 126 exhibit different transmissibilities. Typically, one of the springs 220 and one of the springs 320 will be selected for each of the upper spring and the lower spring assemblies 124 and 126, respectively:

TABLE B

| Dimension | | Example | First Range | Second Range |
|---|---|---|---|---|
| Upper Free Spring Length | | 1.75 in | 1.25-2.25 in | 1-3.5 in |
| Upper Spring Rate | A | 100 lb/in | 100-700 lb/in | 100-700 lb/in |
| | B | 181 lb/in | | |
| | C | 288 lb/in | | |
| | D | 500 lb/in | | |

TABLE B-continued

| Dimension | | Example | First Range | Second Range |
|---|---|---|---|---|
| | E | 680 lb/in | | |
| Lower Spring Length | | 2.0 in | 1.5-2.5 in | 1-4 in |
| Lower Free Spring Rate | A | 90 lb/in | 90-600 lb/in | 90-600 lb/in |
| | B | 162 lb/in | | |
| | C | 248 lb/in | | |
| | D | 425 lb/in | | |
| | E | 585 lb/in | | |

Turning now to FIGS. 4, 5, and 8-14, the example mounting system 34 will now be described in further detail.

Figure 4:
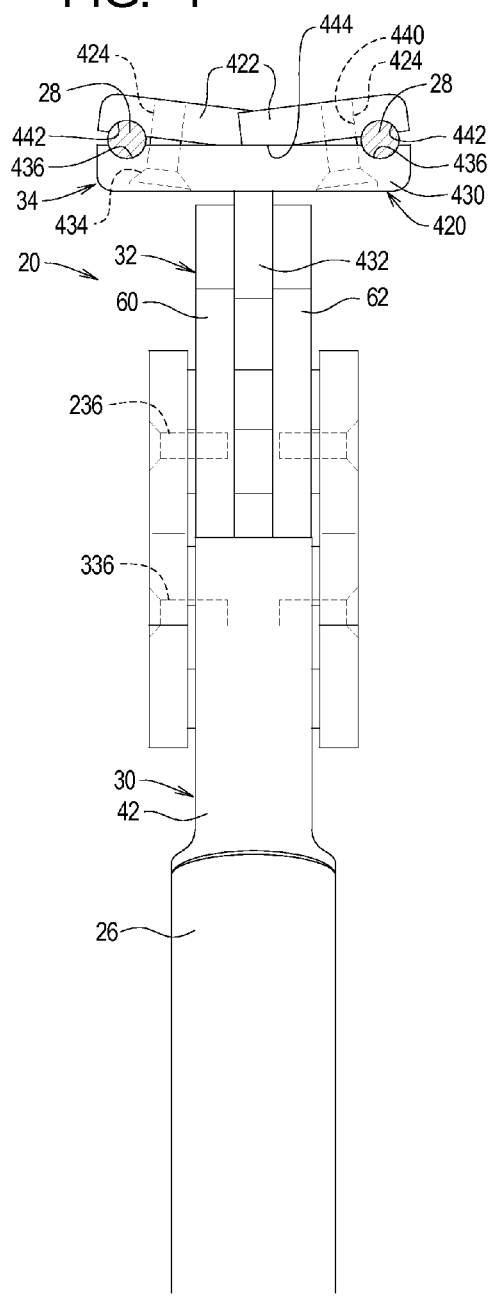
FIG. 4 is a front elevation view depicting the first example suspension system and a first example mounting system for use therewith.
Figure 5:
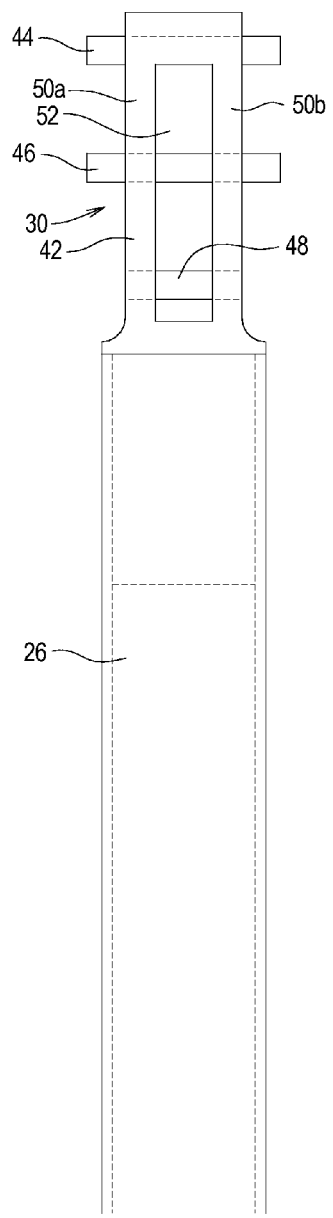
FIG. 5 is a rear elevation view depicting the example first adapter for use with the first example suspension system.

The example mounting system 34 comprises a base member 420, a pair of clamp members 422, and a pair of clamp screws 424. The base member 420 defines a support plate 430 and a pivot flange 432. The pivot plate 432 extends downwardly from a bottom surface of the support plate 430. Clamp openings 434 and a clamp groove 436 are formed in the support plate 430, and pivot openings 438 are formed in the pivot flange 432. A screw opening 440, a second clamp groove 442, and a clamp surface 444 are formed in each of the clamp members 422. In the example mounting system 34, the clamp openings 434 are angled towards each other as shown in FIG. 4 to facilitate access to the clamp screws 424 when the clamp screws 424 are connected to the clamp members 422 through the clamp openings 434.

Figure 8:
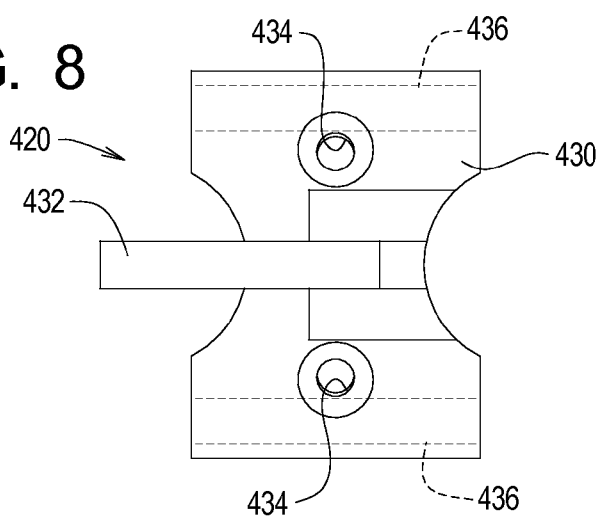
FIG. 8 is a bottom plan view depicting the first example mounting system.
Figure 9:
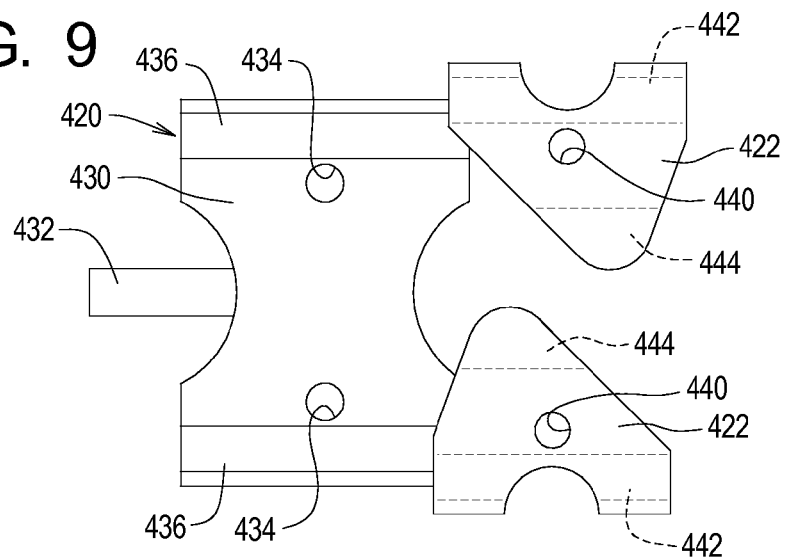
FIG. 9 is a top plan view of the first example mounting system in a disassembled configuration.
Figure 10:
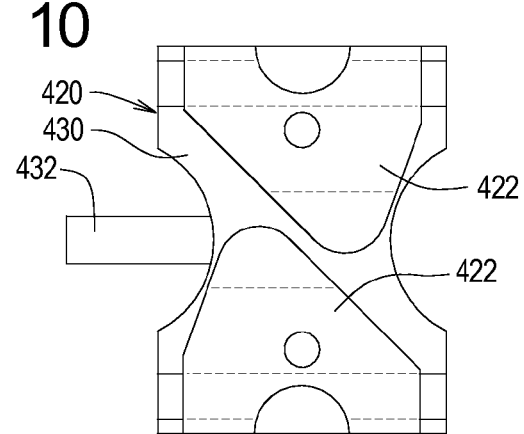
FIG. 10 is a top plan view of the first example mounting system in an assembled configuration.

The clamp screws 424 are threaded into one of the clamp openings 434 and the screw openings 440 to secure the clamp members 422 to the base member 420 as generally shown in FIGS. 8-10. The seat rails 28 are arranged to be received by the first and second clamp grooves 436 and 442 to securely clamp the rails 28 in a desired position relative to the base member 420 when the clamp screws 424 are tightened. The clamp surfaces 444 engage the upper surface of the support plate to enhance the clamping forces applied to the rails 28.

Figure 11:
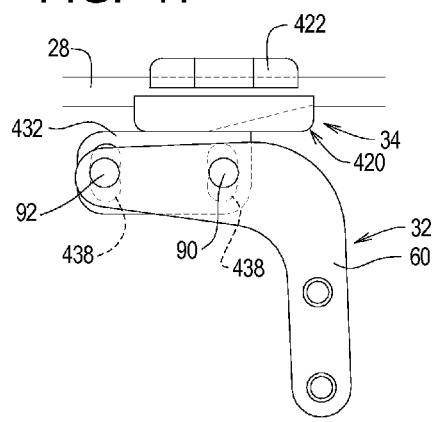
FIGS. 11-13 are side elevation views of the first example mounting system in a rearward position and in various angular positions.
Figure 12:
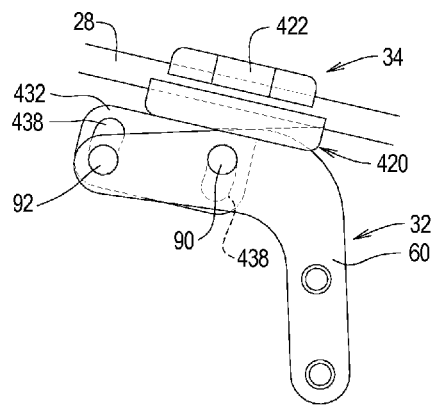
Figure 13:
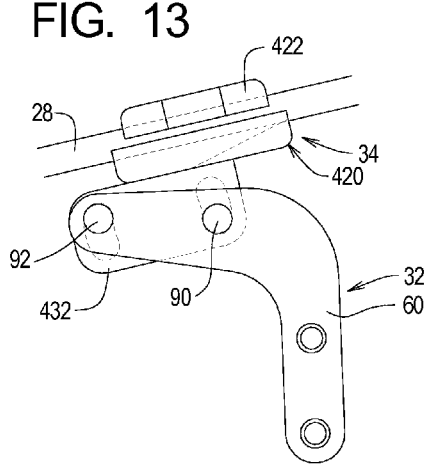
Figure 14:
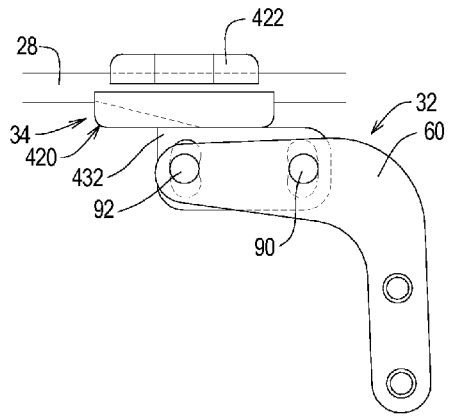
FIG. 14 is a side elevation view of the first example mounting system in a forward position and in a horizontal angular position.
Figure 21:
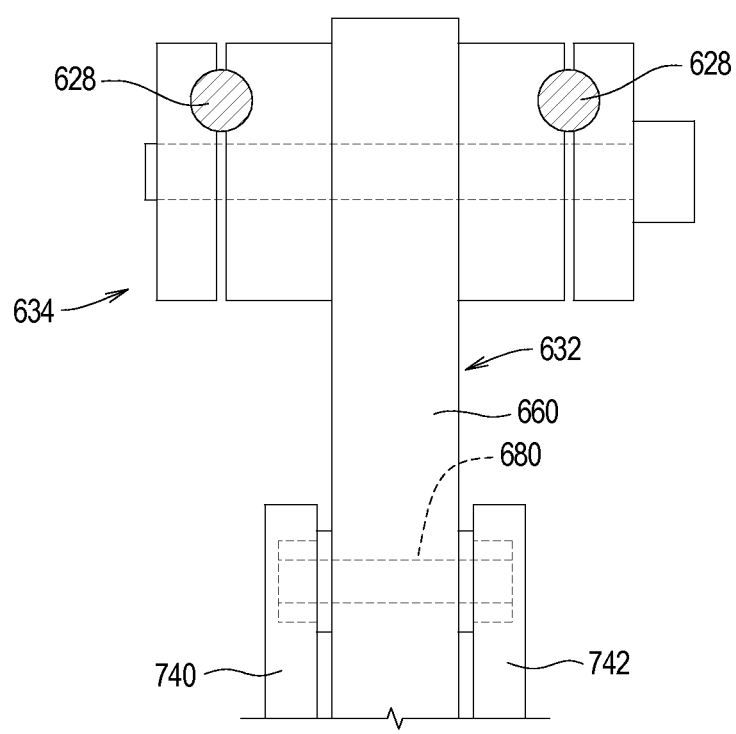
FIG. 21 is a front elevation view depicting the third example suspension system and a second example mounting system for use therewith.
Figure 22:
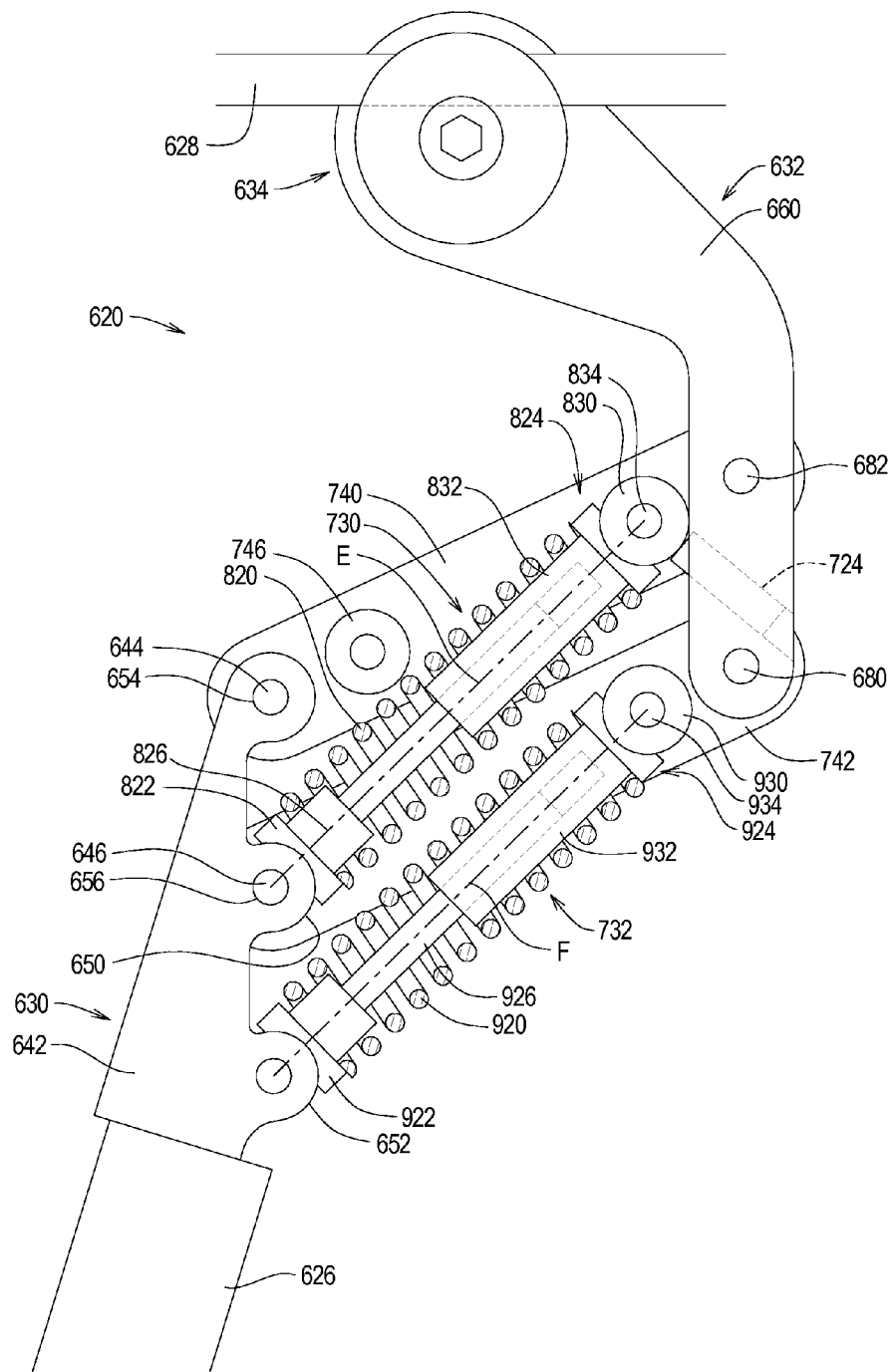
FIG. 22 is a close-up view of the third example suspension system in a first position with the seat tube, the example first adapter, and a portion of the suspension system cut-away.

The pivot openings 438 take the form of elongate, arcuate openings that are sized, dimensioned, and located and oriented relative to each other to receive the first and second pivot bolt assemblies 90 and 92 of the second adapter 32 described above. The pivot openings 438 receive the pivot bolt assemblies to allow pivoting movement of the base member 420 relative to the first and second adapter plates 60 and 62 as shown in FIGS. 11-13. In addition, the example support plate 430 is offset from the pivot flange 432 such that the base member may be supported in a rear position as depicted in FIG. 11 or in a forward position as depicted in FIG. 14. In the forward position, the can also be pivoted in a manner similar to that depicted in FIGS. 12 and 13.

FIG. 15 illustrates that the example mounting system 34 can be used without the suspension system 20. In particular, an adapter plate assembly 460 defining a first wall 462, a second wall 464, and a tube portion 466 is provided. The tube portion 466 engages the seat tube 26 in a conventional manner. The first and second walls 462 and 464 each define first and second wall openings 470 and 472 that receive bolt assemblies 480 and 482. The bolt assemblies 480 and 482 extend through the pivot openings 438 of the base member 420 to allow pivoting movement of the base member 420 relative to the adapter plate assembly 460 as generally described above with respect to the example suspension system 20.

2. Second Example Suspension System

Referring now to FIGS. 16-17 of the drawing, depicted therein is a second example suspension system 520 constructed in accordance with, and embodying, the principles of the present invention. As depicted in FIG. 1, the second example suspension system 520 will typically be used in combination with a bike 522 and a handle bar assembly 524. The bike 522 and handle bar assembly 524 are not part of the present invention and will not be described herein beyond that extent necessary for a complete understanding of the present invention. The example bike 522 defines a steerer 526 that defines a steering axis J.

The suspension system 520 is used in combination with an example first adapter 530, an example second adapter 532, and a second example mounting system 534. The first adapter 530 is configured operatively to connect the suspension system 520 to the steerer 526, and the second adapter 532 and mounting system 534 are configured operatively to connect the suspension system 520 the handle bar assembly 524.

The first adapter 530 comprises a clamp portion 540, a base portion 542, and first, second, and third base pins 544, 546, and 548. The clamp portion 540 is adapted to engage the steerer 526 in a conventional manner. The base portion 542 defines base wall portions 550 between which a base cavity 552 is defined. First, second, and third base openings 554, 556, and 558 are formed in each of the base wall portions 550 and receive the first, second, and third base pins 544, 546, and 548, respectively.

As shown in FIGS. 16 and 17, the second adapter 532 comprises an adapter mount 560 connected to a pair of adapter plates 562 and first, second, and third adapter pins 564, 566, and 568 extending between the adapter plates 562. The example second adapter 532 further comprises a mounting base 570, a clamp fixture 572, a clamp member 574, and bolt assemblies 576. The bolt assemblies 576 secure the mounting base 570 to the adapter mount 560, the clamp fixture 572 to the mounting base 570, and the clamp member 574 to the clamp fixture 572. The handle bar 528 is gripped between the clamp fixture 572 and the clamp member 574 to secure the handle bar 528 relative to the second adapter 532. The mounting base 570 determines a spacing of the handle bar 528 relative to the steering axis J. In FIG. 16, the mounting base 574 is omitted to fit the profile of a first rider, while in FIG. 17 the mounting base 574 is used to space the handle bar 528 further from the second adapter 532 to fit the profile of a second rider.

Alternatively, as shown in FIGS. 18 and 19 the second adapter 532 may comprise, in addition to the adapter mount 560, the pair of adapter plates 562, and the first, second, and third adapter pins 564, 566, and 568, a mounting base 580, a clamp fixture 582, a clamp member 584, a first set of bolt assemblies 586, and a second set of bolt assemblies 588. The first set of bolt assemblies 586 the mounting base 580 to adapter mount 560. The second set of bolt assemblies 588 attach the clamp member 584 to the clamp fixture 582 and the clamp fixture 582 to the mounting base 580. Again, the handle bar 528 is gripped between the clamp fixture 582 and the clamp member 584 to secure the handle bar 528 relative to the second adapter 532. The mounting base 580 determines a spacing of the handle bar 528 relative to the steering axis J, and the mounting base may be rotated as shown by a comparison of FIGS. 18 and 19 to be in a lower position (FIG. 18) or an upper position (FIG. 19) relative to the adapter mount 560.

The second example suspension system 520 comprises a linkage system 590 and a biasing system 592 similar to the linkage system 120 and biasing system 122 described above, and the linkage system 590 and biasing system 592 of the second example suspension system 520 will not be described again in detail herein. As with the first example suspension system 20, when the second example bike 522 travels along an uneven surface, the bike 522 will tend to move up and down relative to a rider grasping the handle bar assembly 524. This up and down movement of the bike 522 relative to the handle bar assembly 524 results in shocks that are resiliently opposed by the second suspension system 520 in a manner similar to that of the first example suspension system 20 described above. In particular, upward movement bike 522 relative to the handle bar assembly 524 is limited, thereby reducing shocks on a rider grasping the handle bar assembly 524.

The example biasing system 592 may be provided with an adjustment bolt such as the example bolt 326 described above, or the adjustment bolt may be omitted if adjustability of the suspension system 520 is not required.

Given that the amount of the rider's weight borne by the handle bar assembly 524 will typically be less than that borne by a seat, the dimensions of the linkage system 590 and the biasing system 592 and the transmissibility of the springs of the biasing system 592 may be altered accordingly.

3. Third Example Suspension System

Referring now to FIGS. 20-23 of the drawing, depicted therein is a third example suspension system 620 constructed in accordance with, and embodying, the principles of the present invention. As depicted in FIG. 20, the third example suspension system 620 will typically be used in combination with a bike (not shown) and a seat assembly (not shown). The bike and seat assembly are not part of the present invention and will not be described herein beyond that extent necessary for a complete understanding of the present invention. As is conventional, the bike will define a seat tube 626 that defines a seat axis A, and the seat assembly defines seat rails 628.

The suspension system 620 is used in combination with an example first adapter 630, an example second adapter 632, and a third example mounting system 634. The first adapter 630 is configured operatively to connect the suspension system 620 to the seat tube 626, and the second adapter 632 and mounting system 634 are configured operatively to connect the suspension system 620 the seat rails 628. The mounting system 634 is or may be conventional and will not be described herein in further detail.

The first adapter 630 comprises a tube structure 640, a base structure 642, a first base pin 644, and a second base pin 646. The tube structure 640 is adapted to be received by and secured to the seat tube 626 in a conventional manner.

The base structure 642 defines a first bearing surface 650, a second bearing surface 652, a first base opening 654, and a second base opening 656. The example first and second bearing surfaces 650 and 652 are arcuate surfaces, and the first bearing surface 650 is substantially coaxially aligned with the second opening 646. The first base openings 654 are formed above the second base openings 656, and the second base openings 656 are formed above the second bearing surface 650. The longitudinal axes of the first and second base openings 654 and 656 and the axis of the second bearing surface 62 are substantially evenly spaced along a base line B that extends at an angle with respect to the seat axis A.

The first adapter 630 is formed by extending the first base pin 644 through the first base opening 654 and such that ends of the first base pin 644 protrude on either side of the base structure 642 and the second base pin 646 through the second base openings 656 and across the base cavity 652 such that ends of the pin 646 protrude on either side of the base structure 642.

The second adapter 632 comprises an adapter plate 660. The example adapter plate 660 defines first, second, and third adapter plate openings 670, 672, and 674. The second adapter 632 further comprises first and second adapter plate pins 680 and 682 that extend through the first and second adapter plate openings 670 and 672, respectively, and protrude on either side of the adapter plate 660. The first and second adapter plate openings 670 and 672 are substantially arranged along a first adapter axis C that extends at an angle with respect to the seat axis A and is substantially parallel to the base axis B.

The third example suspension system 620 comprises a linkage system 720, a biasing system 722, and a set screw 724.

The biasing system 722 comprises upper and lower biasing systems 730 and 732. The upper resilient system 730 defines an upper biasing axis E, and the lower resilient system 732 defines a lower biasing axis F.

The example linkage system 720 comprises a pair of upper link plates 740, a pair of lower link plates 742, a connector bolt 744, and a spacer 746. First, second, third, and fourth upper link plate openings 750, 752, 754, and 756 are formed in the upper link plates 740. First, second, and third lower link plate openings 760, 762, and 764 are formed in the lower link plates 742.

The example upper resilient system 730 is a spring assembly comprising an upper spring 820, an upper spring anchor 822, an upper spring retainer assembly 824, and an upper spring rod 826. The upper spring sleeve retainer assembly 824 comprises an upper spring sleeve 830, an upper spring collar 832, and an upper spring bolt assembly 834. The example lower resilient system 724 is a spring assembly comprising a lower spring 920, a lower spring anchor 922, a lower spring retainer assembly 924, and a lower spring rod 926. The lower spring sleeve retainer assembly 924 comprises a lower spring sleeve 930, a lower spring collar 932, and a lower spring bolt assembly 934.

To form a parallel linkage that allows movement of the second adapter 632 relative to the first adapter 630, the upper link plates 740 are connected between the first base pin 644 and the second adapter plate pin 682 and the lower link plates 742 are connected between the second base pin 646 and the first adapter plate pin 680. In particular, the first base pin 644 extends through the first upper link plate openings 750, the second base pin 646 extends through the first lower link openings 760, the second adapter plate pin 682 extends through the second upper link plate openings 752, and the first adapter plate pin 680 extends through the second lower link plate openings 762.

In addition, the connector bolt 744 is connected between the fourth upper link plate openings 756 to hold the upper link plates 740 in place to form part of the parallel linkage. The spacer 746 is arranged over connector bolt 744 to maintain the upper link plates 740 in a substantially parallel configuration. The upper spring bolt assembly 834 extends between the third upper link plate openings 754 and through upper spring retainer assembly 824 to secure the upper link plates 740 in the parallel linkage and to retain the upper resilient system 730 in its assembled configuration. Similarly, the lower spring bolt assembly 934 extends between the third lower link plate openings 854 and through the lower spring retainer assembly 924 to secure the lower link plates 842 in the parallel linkage and to retain the lower resilient system 732 in its assembled configuration.

The upper spring anchor 822 is rotatably supported by the base structure 642 against the first bearing surface 650. The upper spring sleeve 830 is attached relative to the upper link plates 740 by the upper spring bolt assembly 834. The upper spring 820 and upper spring rod 826 are held between the upper spring anchor 822 and the upper spring collar 832 by the upper spring sleeve 830. Similarly, the lower spring anchor 922 is supported against the second bearing surface 652 of the base structure 642. The lower spring sleeve 930 is supported relative to the lower link plates 742 by the lower spring bolt assembly 934. The lower spring 920 and lower spring rod 926 are held between the lower spring anchor 922 and the lower spring sleeve 930.

When assembled, the linkage system 720 allows movement of the second adapter 632 along a limited arc relative to the first adapter 630 between a first position and a second position through a continuum of intermediate positions. In the first position, the lower spring sleeve 930 is substantially arranged along the first adapter axis C. As the linkage system 720 moves from the first position towards the second position, the upper and lower spring sleeves 830 and 930 are displaced towards the upper and lower spring anchors 822 and 922, thereby compressing the upper and lower springs 820 and 920.

Additionally, the upper biasing axis E defined by the upper resilient system 730 is substantially parallel to the lower biasing axis F defined by the lower resilient system 732. The biasing axes E and F, however, extend a spring angle with respect to the link axes G and H. In the example suspension system 620, in the first position the spring angle is approximately 14 degrees, may be within a first range of approximately 12 to 16 degrees, and in any event should be within a second range of approximately 10 to 18 degrees. The spring angle will increase slightly as the linkage system moves out of the first position towards the second position.

Figure 23:
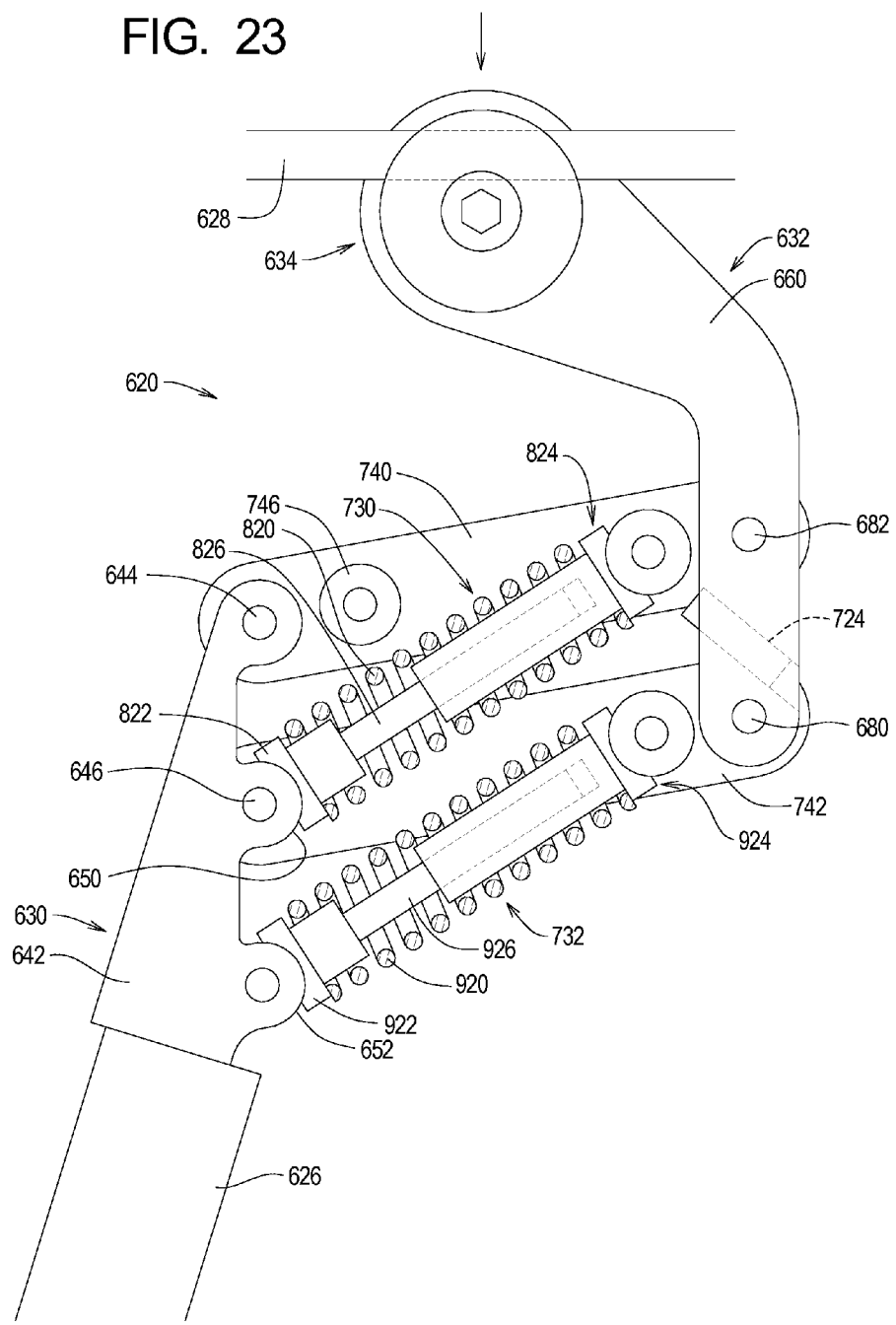
FIG. 23 is a close-up view similar to FIG. 22 with the third example suspension system in a second position.

The biasing system 722 thus biases the second adapter 632 into the first or upper (during normal use of the bike) position relative to the first adapter 630 and thus relative to the bike 622. However, as shown in FIG. 23, a rider sitting on the bicycle seat will cause a slight downward movement of the second adapter 632 out of the first position and towards the second position.

Accordingly, as the bike is traveling along an uneven surface, the bike 622 will tend to move up and down relative to a rider on the seat 624. This up and down movement of the bike relative to the seat causes shocks that are resiliently opposed by the biasing system 722. The biasing system 722 thus resiliently opposes movement of the linkage system 720 such that upward movement bike relative to the seat is limited, thereby reducing shocks on a rider sitting on the seat.

The set screw 724 is configured to engage the upper spring sleeve 830 to displace the linkage system 720 away from its first position to pre-compress the suspension system 620 in a manner generally similar that of the lower spring bolt 326 described above. Again, the set screw 724 is optional and need not be used if pre-compression of the suspension system 620 is not required.

Figure 24:
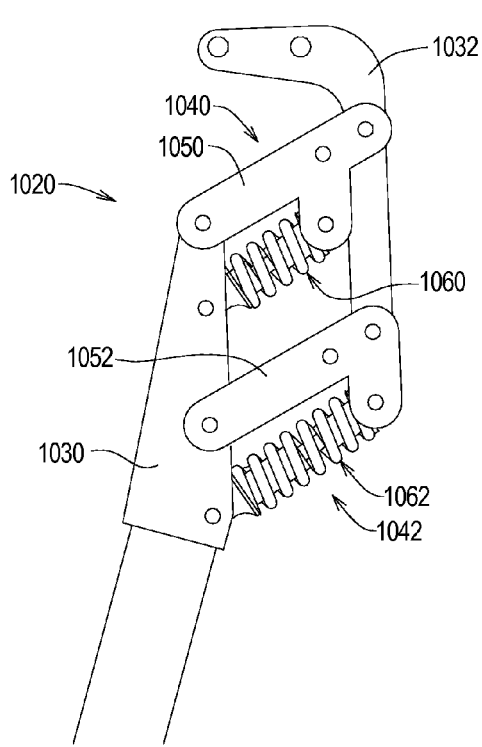
FIG. 24 is a side elevation view of a fourth example suspension system of the present invention.

Turning now to FIG. 24 of the drawing, depicted therein is a fourth example suspension system 1020 constructed in accordance with, and embodying, the principles of the present invention. The fourth example suspension system 1020 is used in combination with an example first adapter 1030, an example second adapter 1032, and a first example mounting system (not shown). The fourth example suspension system 1020 comprises a link system 1040 and a biasing system 1042. The example link system 1040 comprises pairs of upper and lower link plates 1050 and 1052, and the example biasing system 1042 comprises an upper spring assembly 1060 and a lower spring assembly 1062. The example suspension system 1020 is in most respects similar to the first example suspension system 20 describe above, but the upper spring assembly 1060 is arranged between the pairs of upper and lower link plates 1050 and 1052, while the lower spring assembly 1062 is arranged below the pair of lower link plates 1052.

Figure 25:
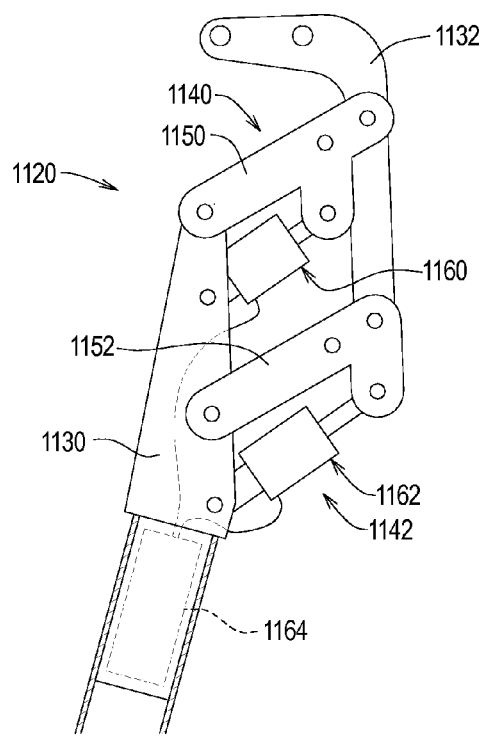
FIG. 25 is a somewhat schematic, side elevation view of a fifth example suspension system of the present invention.

Turning now to FIG. 25 of the drawing, depicted therein is a fifth example suspension system 1120 constructed in accordance with, and embodying, the principles of the present invention. The fifth example suspension system 1120 is used in combination with an example first adapter 1130, an example second adapter 1132, and a first example mounting system (not shown). The fifth example suspension system 1120 comprises a link system 1140 and a biasing system 1142. The example link system 1140 comprises pairs of upper and lower link plates 1150 and 1152, and the example biasing system 1142 comprises an upper gas cylinder assembly 1160, a lower gas cylinder assembly 1162, and a reservoir 1164 operatively connected to the gas cylinder assemblies 1160 and 1162. The example suspension system 1120 is in most respects similar to the fourth example suspension system 1020 described above, but the gas cylinders are used instead of spring assemblies.

From the foregoing, it should be apparent that the present invention in its broadest form may be embodied in a number of forms, the foregoing of which are several examples. The scope of the invention should thus be determined by the claims appended hereto and not the foregoing detailed description of the example embodiments.

While illustrative embodiments have been illustrated and described, it will be appreciated that various changes can be made therein without departing from the spirit and scope of the invention.

The embodiments of the invention in which an exclusive property or privilege is claimed are defined as follows:

1. A bicycle seat suspension assembly comprising:
   a parallelogram linkage comprising a frame link configured to engage a bicycle seat tube, a seat link configured to engage a bicycle seat, an upper link, a lower link, a first pivot pivotally connecting a first end of the lower link to the frame link, a second pivot pivotally connecting a second end of the lower link to the seat link, a third pivot pivotally connecting a first end of the upper link to the frame link, and a fourth pivot pivotally connecting a second end of the upper link to the seat link, wherein the first, second, third, and fourth pivots define a parallelogram;
   an upper spring assembly having a first end that pivotally engages the frame link below the third pivot and a second end that pivotally engages the upper link; and
   a lower spring assembly having a first end that pivotally engages the frame link below the first pivot and a second end that pivotally engages the lower link below the second pivot.

2. The bicycle seat suspension assembly of claim 1, wherein the suspension assembly is movable between an uppermost position wherein the upper and lower spring assemblies are pre-compressed, and a second position wherein the upper and lower spring assemblies are further compressed.

3. The bicycle seat suspension assembly of claim 1, wherein the upper spring assembly pivotally engages the upper link with a fifth pivot located between the third pivot and the fourth pivot.

4. The bicycle seat suspension assembly of claim 1, wherein the first end of the upper spring assembly pivotally engages the frame link through the first pivot.

5. The bicycle seat suspension assembly of claim 1, wherein the lower spring assembly comprises a first compression spring and a spring anchor assembly extending through the first compression spring, the spring anchor assembly having a first end portion abutting one end of the first compression spring, a second end portion abutting the other end of the first compression spring, and an adjustment bolt adjustably connecting the first and second end portions for adjusting a pre-compression of the first compression spring.

6. The bicycle seat suspension assembly of claim 5, wherein the adjustment bolt extends through the second pivot.

7. The bicycle seat suspension assembly of claim 5, wherein the upper spring assembly comprises a second compression spring and a spring anchor assembly extending through the second spring.

8. The bicycle seat suspension assembly of claim 7, wherein the first compression spring is disposed at an angle of between 15 degrees and 21 degrees with respect to the second compression spring when the suspension system is in an uppermost position.

9. The bicycle seat suspension assembly of claim 7, further comprising a third compression spring that is interchangeable with the first compression spring, wherein the third compression spring has a spring rate that is different from a spring rate of the first compression spring.

10. The bicycle seat suspension assembly of claim 7 wherein the first compression spring has a spring rate in the range of 90 and 600 pounds force per inch, and the second compression spring has a spring rate in the range of 100 and 700 pounds force per inch, such that the suspension assembly has an overall spring rate that depends on the spring rates for the first and second compression springs.

11. The bicycle seat suspension assembly of claim 1, wherein the seat link further comprises means for attachment to a bicycle seat and further wherein the frame link further comprises means for engaging a bicycle frame.

12. A bicycle seat suspension assembly comprising:
   a linkage comprising a frame link, a seat link, an upper link, a lower link, a first pivot connecting a first end of the lower link to the frame link, a second pivot connecting a second end of the lower link to the seat link, a third pivot connecting a first end of the upper link to the frame link above the first pivot, and a fourth pivot connecting a second end of the upper link to the seat link above the second pivot;
   an upper spring assembly having a first end that engages the frame link below the third pivot and a second end that engages the upper link; and
   a lower spring assembly having a first end that engages the frame link below the first pivot and a second end that engages the lower link below the second pivot.

13. The bicycle seat suspension assembly of claim 12, wherein the suspension assembly is movable between an uppermost position wherein the upper and lower spring assemblies are pre-compressed, and a second position wherein the upper and lower spring assemblies are further compressed.

14. The bicycle seat suspension assembly of claim 12, wherein the upper spring assembly engages the upper link with a fifth pivot located between the third pivot and the fourth pivot.

15. The bicycle seat suspension assembly of claim 12, wherein the first end of the upper spring assembly engages the frame link through the first pivot.

16. The bicycle seat suspension assembly of claim 12, wherein the lower spring assembly comprises a first compression spring and a spring anchor assembly extending through the first compression spring, the spring anchor assembly having a first end portion abutting one end of the first compression spring, a second end portion abutting the other end of the first compression spring, and an adjustment bolt adjustably connecting the first and second end portion for adjusting a pre-compression of the first compression spring.

17. The bicycle seat suspension assembly of claim 16, wherein the adjustment bolt extends through the second pivot.

18. The bicycle seat suspension assembly of claim 16, wherein the upper spring assembly comprises a second compression spring and a spring anchor assembly extending through the second spring.

19. The bicycle seat suspension assembly of claim 18, wherein the first compression spring is disposed at an angle of between 15 degrees and 21 degrees with respect to the second compression spring when the suspension system is in an uppermost position.

20. The bicycle seat suspension assembly of claim 18, further comprising a third compression spring that is interchangeable with the first compression spring, wherein the third compression spring has a spring rate that is different from a spring rate of the first compression spring.

21. The bicycle seat suspension assembly of claim 18 wherein the first compression spring has a spring rate in the range of 90 and 600 pounds force per inch, and the second compression spring has a spring rate in the range of 100 and 700 pounds force per inch, such that the suspension assembly has an overall spring rate that depends on the spring rates for the first and second compression springs.

\* \* \* \* \*